United States Patent
Kang

(10) Patent No.: US 11,685,310 B2
(45) Date of Patent: Jun. 27, 2023

(54) WARNING CONDITION ADJUSTING APPARATUS AND METHOD

(71) Applicant: HYUNDAI MOBIS CO., LTD., Seoul (KR)

(72) Inventor: Eun Seok Kang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 22 days.

(21) Appl. No.: 17/387,300

(22) Filed: Jul. 28, 2021

(65) Prior Publication Data
US 2021/0362650 A1 Nov. 25, 2021

Related U.S. Application Data

(63) Continuation of application No. 16/570,169, filed on Sep. 13, 2019, now Pat. No. 11,458,890.

(30) Foreign Application Priority Data

Sep. 13, 2018 (KR) .......................... 10-2018-0109302

(51) Int. Cl.
*B60Q 9/00* (2006.01)
*G01S 13/931* (2020.01)

(52) U.S. Cl.
CPC ............ *B60Q 9/008* (2013.01); *G01S 13/931* (2013.01); *G01S 2013/9314* (2013.01)

(58) Field of Classification Search
CPC ... B60Q 9/008; G01S 13/931; G01S 13/9314; G01S 13/93272; B60W 50/14; B60W 50/16; B60W 2420/52; B60W 2520/06; B60W 2050/143; B60W 30/08; B60W 40/02
(Continued)

(56) References Cited

U.S. PATENT DOCUMENTS 6,898,527 B2 * 5/2005 Kimura ................ B62D 15/028
340/436
9,836,978 B2 * 12/2017 Imai ...................... B60Q 9/008
(Continued)

FOREIGN PATENT DOCUMENTS

CN 1066660482 A 5/2017
CN 104260722 B * 6/2017 ............ B60W 30/06
(Continued)

OTHER PUBLICATIONS

Office Action issued in corresponding Chinese Patent Application No. 201910857989.0 dated Jul. 21, 2022.
(Continued)

*Primary Examiner* — Atul Trivedi
(74) *Attorney, Agent, or Firm* — Morgan, Lewis & Bockius LLP

(57) ABSTRACT

A warning condition adjusting apparatus may include: a processor configured to determine whether a parking direction of an ego vehicle is a first direction or a second direction, using traveling information of a target vehicle; and to maintain a preset warning condition of a rear cross collision warning (RCCW) system when the parking direction of the ego vehicle is the first direction, and change the warning condition of the RCCW system when the parking direction of the ego vehicle is the second direction.

12 Claims, 4 Drawing Sheets

(58) Field of Classification Search
USPC .......................................................... 701/301
See application file for complete search history.

(56) References Cited

U.S. PATENT DOCUMENTS

| | | | | |
|---|---|---|---|---|
| 9,862,416 | B2* | 1/2018 | Imai | B60K 31/0008 |
| 9,937,905 | B2* | 4/2018 | Kim | B60W 30/0956 |
| 11,610,441 | B1* | 3/2023 | Bernico | G06Q 40/08 |
| 2003/0004617 | A1 | 1/2003 | Kimura et al. | |
| 2010/0253543 | A1* | 10/2010 | Szczerba | G06V 20/58 |
| | | | | 340/932.2 |
| 2010/0271238 | A1 | 10/2010 | Reed et al. | |
| 2012/0262284 | A1* | 10/2012 | Irrgang | B60W 50/14 |
| | | | | 340/435 |
| 2016/0052515 | A1* | 2/2016 | Choi | B60W 30/0953 |
| | | | | 701/1 |
| 2016/0114798 | A1* | 4/2016 | Kim | G08G 1/166 |
| | | | | 701/41 |
| 2017/0028985 | A1* | 2/2017 | Kiyokawa | G05D 1/0088 |
| 2017/0197551 | A1* | 7/2017 | Lee | B60W 30/0953 |
| 2018/0093664 | A1* | 4/2018 | Kim | B60W 10/18 |
| 2018/0105167 | A1* | 4/2018 | Kim | G05D 1/0016 |
| 2018/0105208 | A1* | 4/2018 | Kim | G05D 1/0061 |
| 2018/0107207 | A1* | 4/2018 | Kim | B62D 15/0285 |
| 2020/0239020 | A1* | 7/2020 | Aoki | B60W 50/14 |

FOREIGN PATENT DOCUMENTS

| | | | | |
|---|---|---|---|---|
| EP | 3299843 | A1 * | 3/2018 | ............ G01S 13/08 |
| EP | 3342682 | A1 * | 7/2018 | ............ B60R 25/10 |
| GB | 2552030 | A * | 1/2018 | ............ B60K 28/16 |
| JP | 2016-023947 | A | 2/2016 | |
| JP | 2017-043355 | A | 3/2017 | |
| JP | 2017-222309 | A | 12/2017 | |
| KR | 10-2014-0093358 | A | 7/2014 | |
| KR | 10-2015-0019785 | A | 2/2015 | |
| KR | 10-2017-0000569 | A | 1/2017 | |
| KR | 10-2018-0078981 | A | 7/2018 | |
| WO | WO-2008104488 | A1 * | 9/2008 | ............ B60W 10/20 |
| WO | WO-2019069430 | A1 * | 4/2019 | ............ B60Q 9/00 |

OTHER PUBLICATIONS

Notice of Allowance issued in corresponding Korean Patent Application No. 10-2020-0068470 dated Feb. 7, 2022, with English translation.

Office Action issued in corresponding Korean Patent Application No. 10-2020-0068470 dated Aug. 23, 2021, with English translation.

Office Action issued in corresponding Korean Patent Application No. 10-2018-0109302 dated Mar. 22, 2023.

Office Action issued in corresponding Chinese Patent Application No. 2021109137245 dated Apr. 29, 2023, with English translation.

* cited by examiner

First-Direction Parking

Second-Direction Parking

WARNING CONDITION ADJUSTING APPARATUS AND METHOD

CROSS-REFERENCES TO RELATED APPLICATIONS

The present application is the continuation application of U.S. patent application Ser. No. 16/570,169, filed on Sep. 13, 2019, which claims priority to Korean application number 10-2018-0109302, filed on Sep. 13, 2018, which is incorporated by reference in its entirety.

BACKGROUND

The present disclosure relates to an apparatus and method for adjusting a warning condition in a rear cross collision warning (RCCW) system.

In general, a vehicle has a radar sensor mounted on the rear thereof and configured to sense an obstacle or object, and thus senses the following vehicle. Based on data sensed by the radar sensor, the RCCW system senses another vehicle or an obstacle when the vehicle is driven or parked. When the vehicle is approaching a position where a collision is likely to occur, the RCCW system outputs a predetermined warning signal to a driver such that the driver can safely drive the vehicle.

The related art is technical information which the present inventor has retained to derive the present disclosure or has acquired during the process of deriving the present disclosure. The related art is not necessarily a publicly known technique which is published to the public before the application of the present disclosure.

RELATED ART DOCUMENT

Patent Document (Patent Document 1) Korean Patent Application Laid-Open No. 2014-0093358

SUMMARY

Embodiments of the present disclosure are directed to a warning condition adjusting apparatus and method which can prevent a situation in which an RCCW system does not issue a warning, when a vehicle is parked in an oblique direction.

Also, embodiments of the present disclosure are directed to a warning condition adjusting apparatus and method which can prevent a situation in which a warning of an RCCW system is delayed, when a vehicle is parked in an oblique direction.

In one embodiment, a warning condition adjusting apparatus may include a processor configured to: determine whether a parking direction of an ego vehicle is a first direction or a second direction, using traveling information of a target vehicle; and maintain a preset warning condition of an RCCW system when the parking direction of the ego vehicle is the first direction, and change the warning condition of the RCCW system when the parking direction of the ego vehicle is the second direction.

The processor determines the parking direction of the ego vehicle by comparing a preset reference axis to a radar axis generated through a radar signal reflected from the target vehicle in response to a radar signal transmitted from a radar sensor installed in the ego vehicle. The processor may determine that the parking direction of the ego vehicle is the first direction, when the comparison result indicates that the radar axis is similar to the reference axis, and determine that the parking direction of the ego vehicle is the second direction, when the comparison result indicates that the radar axis is different from the reference axis.

The processor may be further configured to calculate an entry angle at which the ego vehicle enters a parking space in the second direction, with respect to the reference axis, and compensate for detection information of the ego vehicle, included in the warning condition of the RCCW system, by the entry angle.

In another embodiment, a warning condition adjusting method may include: determining, by a processor, whether a parking direction of an ego vehicle is a first direction or a second direction, using traveling information of a target vehicle; and maintaining, by the processor, a preset warning condition of an RCCW system when the parking condition of the ego vehicle is the first direction, and changing the warning condition of the RCCW system when the parking direction of the ego vehicle is the second direction.

The determining of whether the parking direction of the ego vehicle is the first or second direction may include: comparing a preset reference axis to a radar axis generated through a radar signal reflected from the target vehicle in response to a radar signal transmitted from a radar sensor installed in the ego vehicle; and determining the parking direction of the ego vehicle according to the comparison result of the comparing of the preset reference axis to the radar axis.

The determining of the parking direction of the ego vehicle may include: determining that the parking direction of the ego vehicle is the first direction, when the radar axis and the reference axis are similar to each other; and determining that the parking direction of the ego vehicle is the second direction, when the radar axis and the reference axis are different from each other.

The warning condition adjusting method may further include: calculating, by the processor, an entry angle at which the ego vehicle enters a parking space in the second direction, with respect to the reference axis; and compensating for, by the processor, detection information of the ego vehicle, included in the warning condition of the RCCW system, by the entry angle.

In still another embodiment, there is provided a computer program stored in a computer readable recording medium to execute the warning condition adjusting method, using a computer.

In accordance with the embodiments of the present disclosure, the warning condition adjusting apparatus and method can prevent a situation in which the RCCW system does not issue a warning, when the vehicle is parked in an oblique direction.

Furthermore, the warning condition adjusting apparatus and method can prevent a situation in which a warning of the RCCW system is delayed, when the vehicle is parked in an oblique direction.

DESCRIPTION OF SPECIFIC EMBODIMENTS

Figure 1:
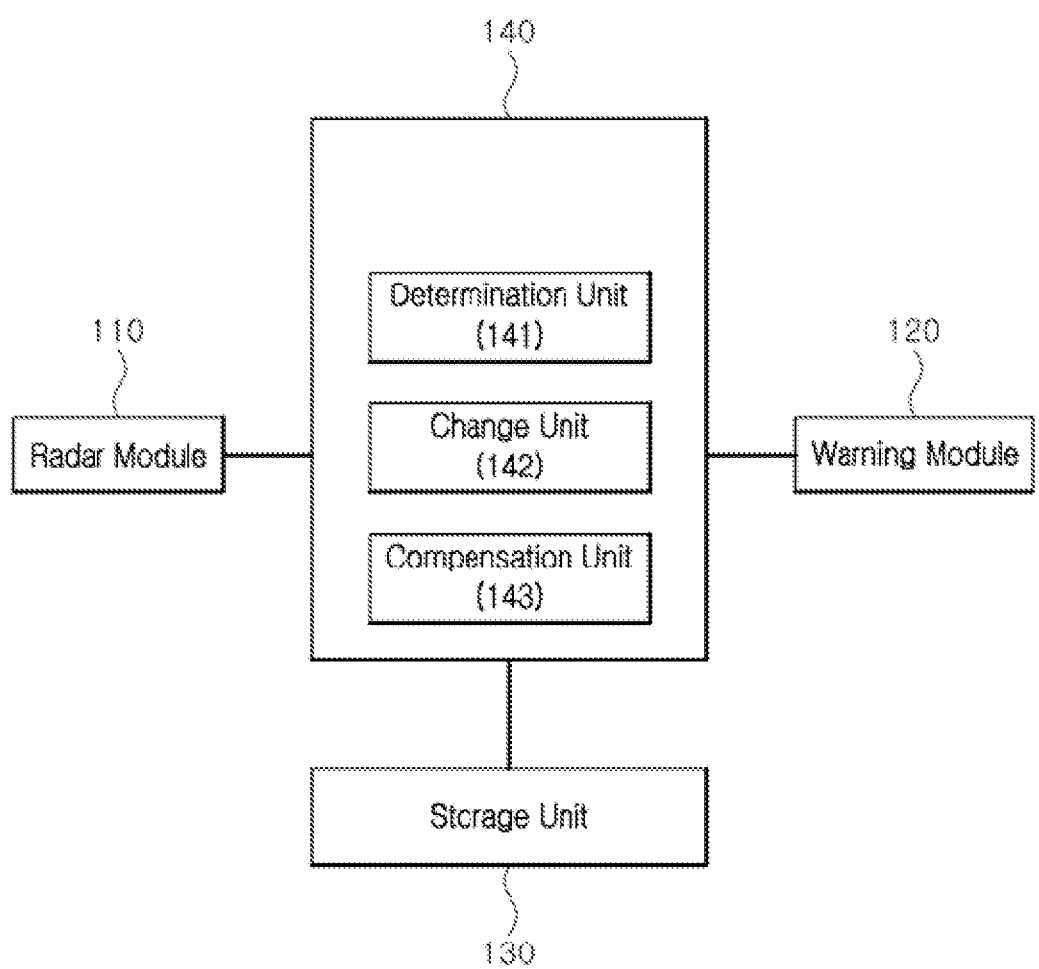
FIG. 1 is a diagram schematically illustrating a warning condition adjusting apparatus in accordance with an embodiment of the present disclosure.

The disclosure is described more fully hereinafter with reference to the accompanying drawings, in which embodiments of the disclosure are shown. This disclosure may, however, be embodied in many different forms and should not be construed as limited to the embodiments set forth herein. Rather, these embodiments are provided so that this disclosure is thorough, and will fully convey the scope of the disclosure to those skilled in the art. Like reference numerals in the drawings denote like elements.

Various advantages and features of the present disclosure and methods accomplishing thereof will become apparent from the following description of embodiments with reference to the accompanying drawings. However, the present disclosure is not be limited to the embodiments set forth herein but may be implemented in many different forms. The present embodiments may be provided so that the disclosure of the present disclosure will be complete, and will fully convey the scope of the disclosure to those skilled in the art and therefore the present disclosure will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereafter, a warning condition adjusting apparatus and method in accordance with an embodiment of the present disclosure will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the disclosure into account and can be changed according to the custom or intention of users or operators. Therefore, definition of the terms should be made according to the overall disclosures set forth herein.

The terms used in this application are only used to describe a specific embodiment, and not intended to limit the present disclosure. The terms of a singular form may include plural forms unless referred to the contrary. In this application, the meaning of "include" or "have" only specifies a property, number, step, operation, component, part or combinations thereof, and does not exclude one or more other properties, numbers, steps, operations, components, parts or combinations thereof. The terms such as first and second may be used to describe various components, but the components should not be limited by the terms. The terms are used only to distinguish one component from another component.

Figure 2A:
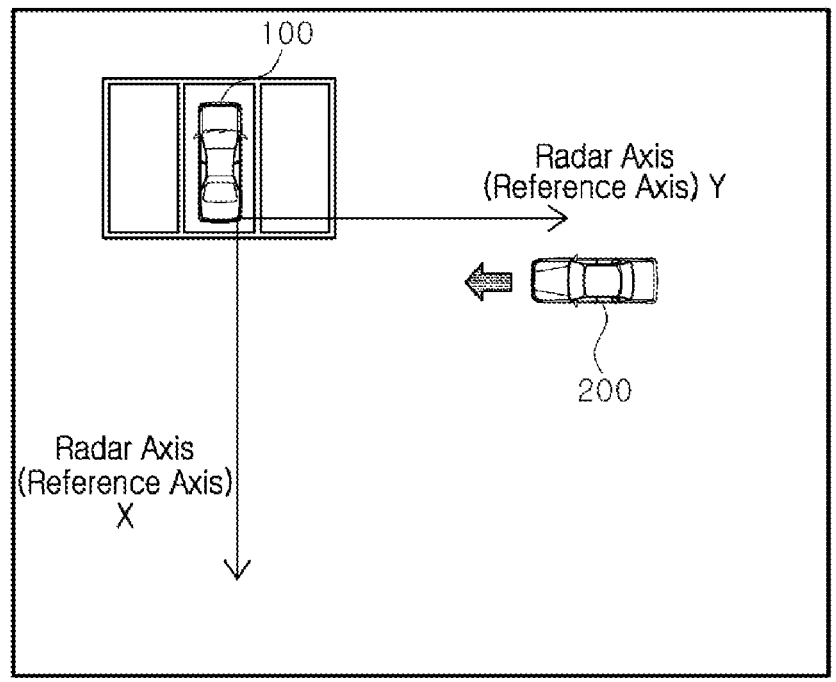
FIGS. 2A-2B shows diagrams schematically illustrating parking directions of an ego vehicle including the warning condition adjusting apparatus of FIG. 1.
Figure 2B:
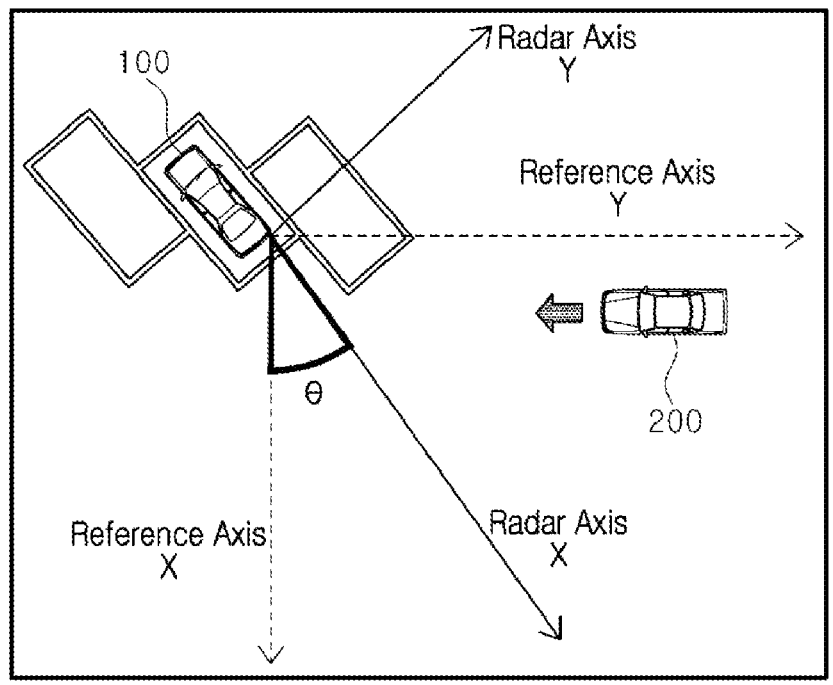
Figure 3A:
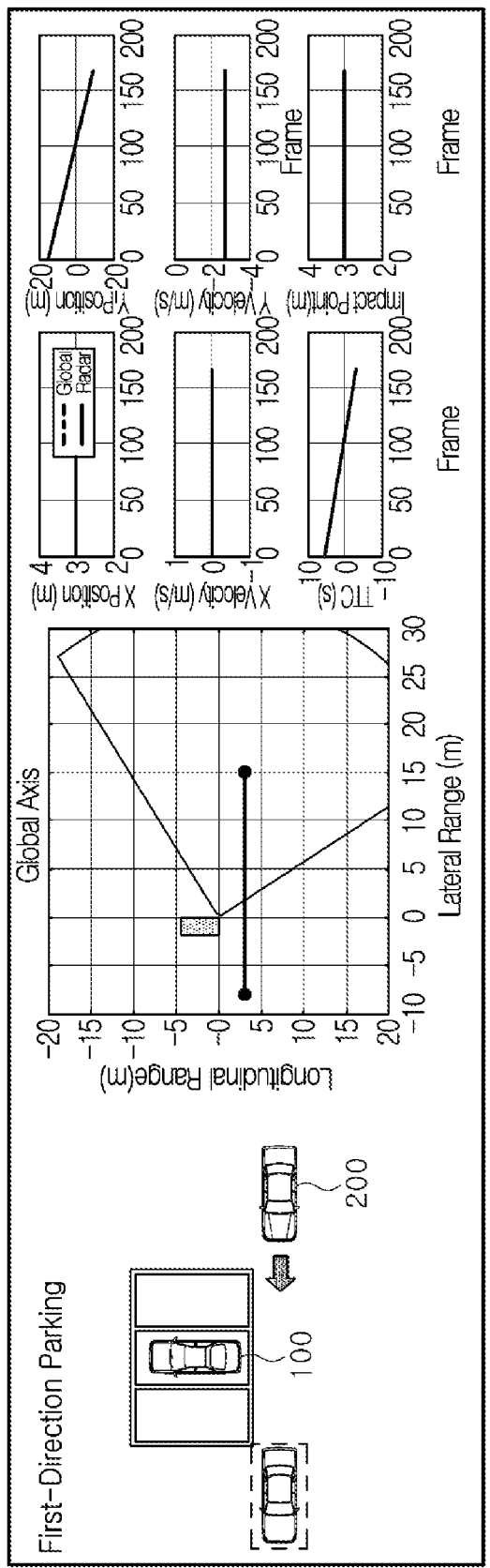
FIGS. 3A-3B shows diagrams schematically illustrating detection information depending on the parking directions of the ego vehicle including the warning condition adjusting apparatus of FIG. 1.
Figure 3B:
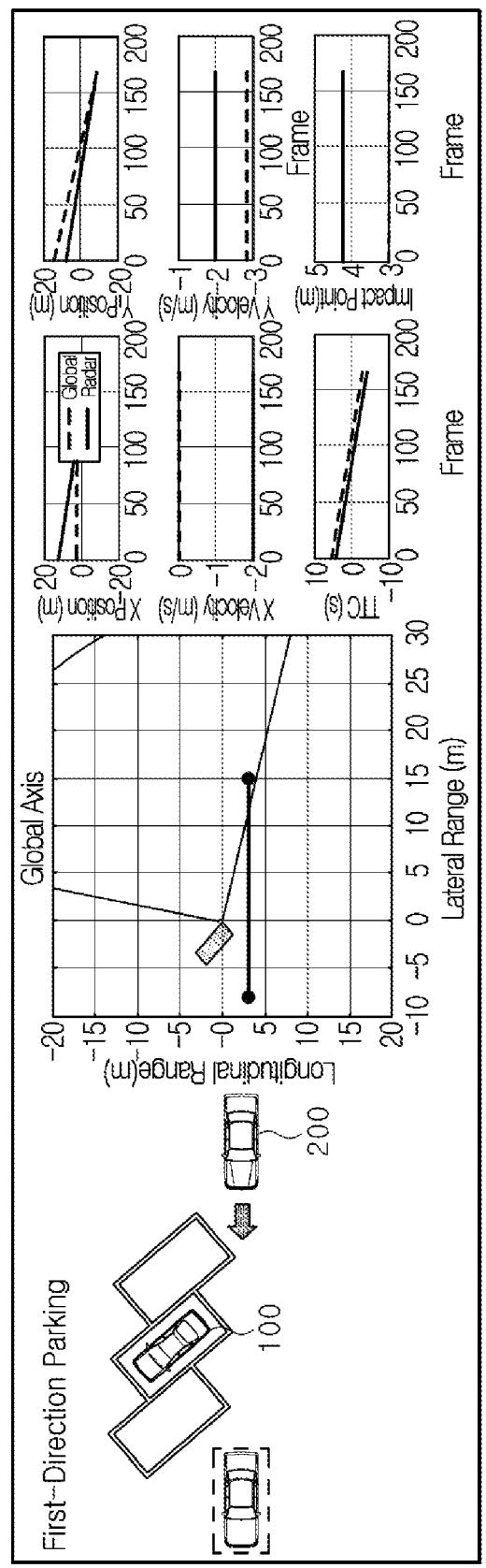

FIG. 1 is a diagram schematically illustrating a warning condition adjusting apparatus in accordance with an embodiment of the present disclosure, FIG. 2 shows diagrams schematically illustrating parking directions of an ego vehicle including the warning condition adjusting apparatus of FIG. 1, and FIG. 3 shows diagrams schematically illustrating detection information depending on the parking directions of the ego vehicle including the warning condition adjusting apparatus of FIG. 1.

Referring to FIG. 1, the warning condition adjusting apparatus 1 may include a radar module 110, a warning module 120, a storage unit 130 and a processor 140. The warning condition adjusting apparatus 1 may be installed in a vehicle (an ego vehicle 100 and a target vehicle 200 of FIG. 2). Hereafter, the descriptions will be made under the supposition that the warning condition adjusting apparatus 1 is installed in the ego vehicle 100 of FIG. 2, for convenience of description.

The radar module 110 may be installed at one or more of the front, rear and/or sides of the ego vehicle 100, and detect the target vehicle 200 which is present at one or more of the front, rear and/or sides of the ego vehicle 100. The radar module 110 may transmit a radar signal to the target vehicle 200, receive a radar signal reflected from the target vehicle 200 in response to the transmitted radar signal, and transfer the received radar signal to the processor 140. The processor 140 may generate predetermined information using the radar signal received from the radar module 110.

The warning module 120 may serve to issue a warning to a driver who drives the ego vehicle 100. In an embodiment, the warning module 120 may issue a warning through various methods such as a visual method, an auditory method and a tactual method. In an embodiment, the warning module 120 may display a warning on an instrument panel of a driver seat, a head-up display, a navigation system, an integrated information display device or the like. In another embodiment, the warning module 120 may issue a warning through a speaker of the ego vehicle 100. In still another embodiment, the warning module 120 may warn the driver by vibrating a steering wheel of the ego vehicle 100 or tightening a safety belt. The warning module 120 may output a warning to such an extent that the driver of the ego vehicle 100 can recognize the warning, in response to a warning output signal from the processor 140.

The storage unit 130 may store various programs or data while interworking with the processor 140. The storage unit 130 may store a program required for the warning condition adjusting apparatus 1 to output a warning depending on a rear cross collision risk. In an embodiment, the storage unit 130 may store reference axis (X-axis, Y-axis) information indicating a first direction as the direction in which the ego vehicle 100 is perpendicular parked. In another embodiment, the storage unit 130 may store reference detection information as a warning condition that can operate the RCCW system to output a warning. For example, the reference detection information may include a reference horizontal axis distance, a reference vertical axis distance, a reference horizontal axis velocity, a reference vertical axis velocity, a reference collision estimated time, a reference collision point and the like. When the determination result of the processor 140 indicates that information received from the target vehicle 200 satisfies the reference detection information, a warning may be outputted.

The storage unit 130 may also include a high-speed random access memory. The storage unit 130 may include one or more nonvolatile memory devices such as a magnetic disk storage device, a flash memory device and other non-volatile solid-state memory devices. However, the scope of the present disclosure is not limited thereto, and the storage unit 130 may include a readable storage medium. For example, the storage unit 130 may include an EEP-ROM (Electronically Erasable and Programmable Read Only Memory), but the scope of the present disclosure is not limited thereto. The EEP-ROM may write and erase information under control of the processor 140, during an operation of the processor 140. The EEP-ROM may be a memory device that does not lose information stored therein but retains the information, even though power supply is cut off due to a power-off.

The processor 140 may generate detection information using information on the time at which the radar module 110 transmits a radar signal and information on the time at which the processor 140 receives a radar signal reflected from the target vehicle 200. The detection information may include one or more of horizontal distance information and vertical distance information from the ego vehicle 100 to the target vehicle 200, a horizontal axis velocity and vertical axis velocity of the target vehicle 200, a collision estimated time at which the target vehicle 200 will collide with the ego vehicle 100, a point where the target vehicle 200 collides with the ego vehicle 100 and an angle of the target vehicle 200.

The processor 140 may determine whether the parking direction of the ego vehicle 100 is a first or second direction, using traveling information of the target vehicle 200. The processor 140 may maintain a preset warning condition of the RCCW system when the parking direction of the ego vehicle 100 is the first direction, and change the warning condition of the RCCW system when the parking direction of the ego vehicle 100 is the second direction.

In the present embodiment, the processor 140 serving as a kind of CPU (Central Processing Unit) may provide various functions by driving control software stored in the storage unit 130. The processor 140 may include all kinds of devices capable of processing data, such as a processor. Here, 'processor' may indicate a data processing device which has a physically structured circuit to perform a function expressed as a code or command included in a program and is embedded in hardware. Examples of the data processing device embedded in hardware may include a microprocessor, a CPU, a processor core, a multiprocessor, an ASIC (Application-Specific Integrated Circuit), an FPGA (Field Programmable Gate Array) and the like, but the scope of the present disclosure is not limited thereto.

In the present embodiment, the processor 140 may include a determination unit 141, a change unit 142 and a compensation unit 143.

The determination unit 141 may compare the reference axis stored in the storage unit 130 to a radar axis generated through the radar signal reflected from the target vehicle 200 in response to the radar signal transmitted from the radar module 110. The determination unit 141 may determine that the parking direction of the ego vehicle 100 is the first direction, when the radar axis and the reference axis are similar to each other, and determine that the parking direction of the ego vehicle 100 is the second direction, when the radar axis and the reference axis are different from each other. The first direction may indicate that the ego vehicle 100 is perpendicular parked as illustrated in (a) of FIG. 2, and the second direction may indicate that the ego vehicle 100 is parked in a non-perpendicular direction as illustrated in (b) of FIG. 2. That is, in the present embodiment, the first direction may include the perpendicular direction, and the second direction may include the non-perpendicular direction (for example, an oblique direction or diagonal direction).

The change unit 142 may maintain the warning condition of the RCCW system, stored in the storage unit 130, when the determination result of the determination unit 141 indicates that the parking direction of the ego vehicle 100 is the first direction, and change the warning condition of the RCCW system when the parking direction of the ego vehicle 100 is the second direction.

Recently, parking spaces are designed in various manners. For example, the parking spaces may include not only a first-direction parking space illustrated in (a) of FIG. 2, but also a second-direction parking space illustrated in (b) of FIG. 2 as in an expressway rest area. In general, the RCCW system is designed based on the first-direction parking space. Therefore, when the ego vehicle 100 is parked in the first direction, detection information may be almost similar to the reference detection information as illustrated in (a) of FIG. 3. However, when the ego vehicle 100 is parked in the second direction, the detection information may be different from the reference detection information. Therefore, although an obstacle and/or the target vehicle 200 are present around the ego vehicle 100, no warning may be issued or a warning may not be issued on time but issued later. Furthermore, even when the ego vehicle 100 is parked in the first direction, the RCCW system may not actually perform a normal function because the rear of the ego vehicle 100 faces a wall surface in many cases. Therefore, the processor 140 may adjust the warning condition by analyzing the detection tendency of the radar module 110 on the parking in the second direction, thereby securing stability for the parking in the second direction.

In order to change the warning condition of the RCCW system when the parking direction of the ego vehicle 100 is the second direction, the compensation unit 143 may calculate an entry angle θ at which the ego vehicle 100 enters a parking space in the second direction, with respect to the reference axis, and compensate for the detection information of the ego vehicle 100 by the entry angle θ, the detection information being included in the warning condition of the RCCW system, stored in the storage unit 130.

The compensation unit 143 may use Equation 1 below to calculate the entry angle θ at which the ego vehicle 100 enters the parking space, with respect to the reference axis.

$$\text{Entry angle}(\theta) = \tan^{-1}\frac{V_X}{V_Y} \quad \text{[Equation 1]}$$

In Equation 1, $V_X$ may represent the horizontal axis velocity of the target vehicle 200 with respect to the radar horizontal axis in the second direction, and $V_Y$ may represent the vertical axis velocity of the target vehicle 200 with respect to the radar vertical axis in the second direction.

The compensation unit 143 may compensate for the detection information of the ego vehicle 100 by the entry angle θ, when the calculation of the entry angle θ of the ego vehicle 100 is completed. The compensation target may include the horizontal distance information X and the vertical distance information Y from the ego vehicle 100 to the target vehicle 200 and the horizontal axis velocity $V_X$ and the vertical axis velocity $V_Y$ of the target vehicle 200, among the pieces of detection information of the ego vehicle 100. The other pieces of detection information, for example, the collision estimated time at which the target vehicle 200 will collide with the ego vehicle, the point where the target vehicle 200 collides with the ego vehicle 100 and the angle of the target vehicle 200 may be calculated by the compensation target.

The compensation unit 143 may calculate compensation horizontal distance information $X_C$ and compensation vertical distance information $Y_C$ through Equation 2 below, based on the horizontal distance information X and the vertical distance information Y from the ego vehicle 100 to the target vehicle 200. Furthermore, the compensation unit 143 may calculate compensation horizontal axis velocity $V_{XC}$ and compensation vertical axis velocity $V_{YC}$ through Equation 2 below, based on the horizontal axis velocity $V_X$ and the vertical axis velocity $V_Y$ of the target vehicle 200.

$$\begin{bmatrix} X_C \\ Y_C \end{bmatrix} = \begin{bmatrix} \cos\theta & -\sin\theta \\ \sin\theta & \cos\theta \end{bmatrix}\begin{bmatrix} X \\ Y \end{bmatrix} \quad \text{[Equation 2]}$$

$$\begin{bmatrix} V_{XC} \\ V_{YC} \end{bmatrix} = \begin{bmatrix} \cos\theta & -\sin\theta \\ \sin\theta & \cos\theta \end{bmatrix}\begin{bmatrix} V_X \\ V_Y \end{bmatrix}$$

When the compensation for the compensation target by the entry angle θ is completed, the change unit 142 may compensate for one or more of the other pieces of detection information, for example, the collision estimated time at which the target vehicle 200 will collide with the ego vehicle 100, the point where the target vehicle 200 collides with the ego vehicle 100, and the angle of the target vehicle 200, using the compensation horizontal distance information $X_C$ and the compensation vertical distance information $Y_C$ and the compensation horizontal axis velocity $V_{XC}$ and the compensation vertical axis velocity $V_{YC}$.

The change unit 142 may change the reference detection information, which is included in the reference warning condition of the RCCW system stored in the storage unit 130, into compensation detection information compensated for by the entry angle θ, or separately store the compensation detection information.

As the warning condition of the RCCW system is adaptively changed through the above-described operation according to the parking direction of the ego vehicle 100, it is possible to prevent an abnormal situation which may occur when the ego vehicle 100 is parked in an oblique direction, for example, a situation in which no warning of the RCCW system is issued or a warning of the RCCW system is delayed.

Figure 4:
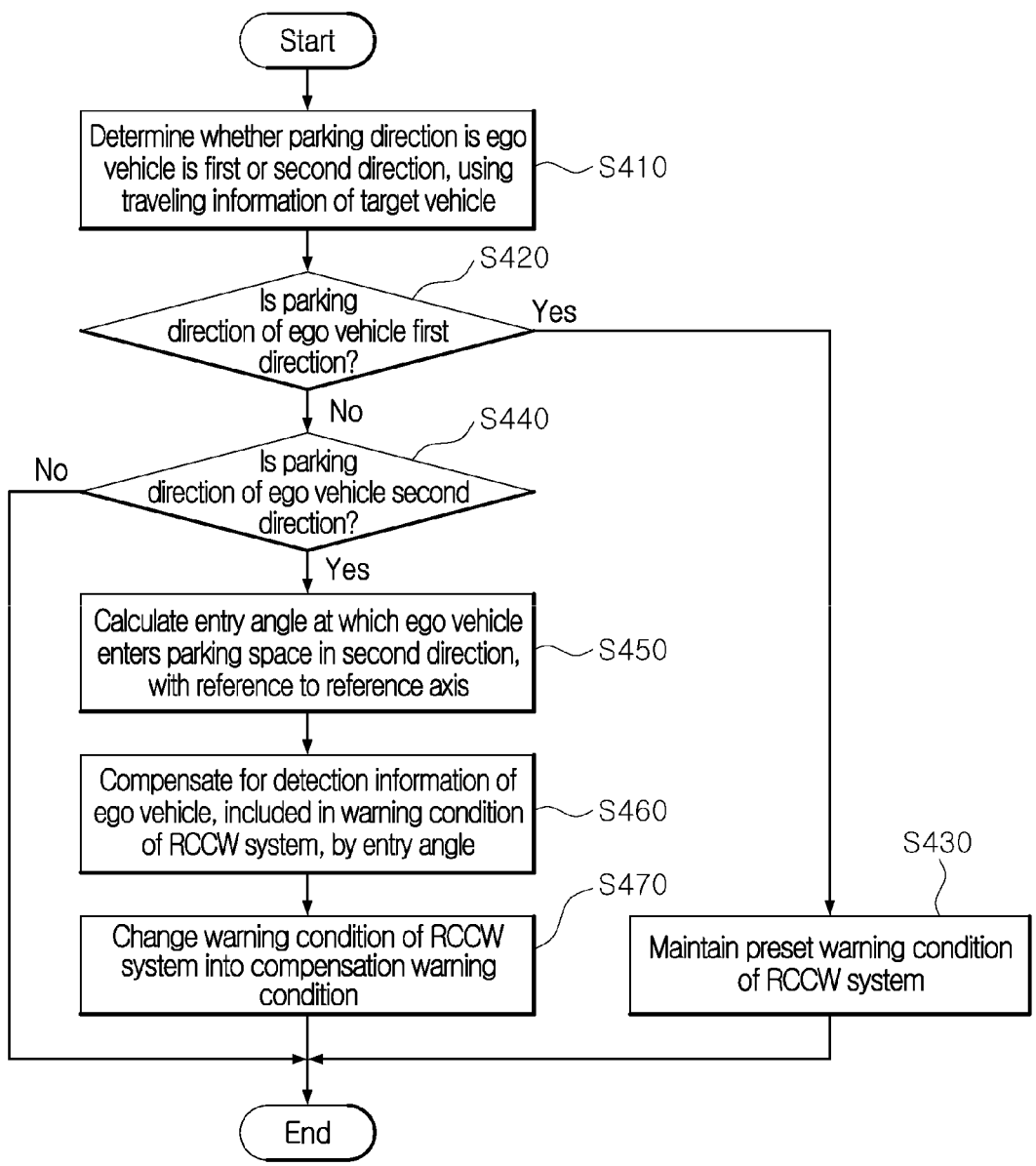
FIG. 4 is a flowchart illustrating a warning condition adjusting method in accordance with an embodiment of the present disclosure.

FIG. 4 is a flowchart illustrating a warning condition adjusting method in accordance with an embodiment of the present disclosure. Hereafter, the descriptions of contents overlapping the descriptions of FIGS. 1 to 3 will be omitted herein.

Referring to FIG. 4, the warning condition adjusting apparatus 1 may determine whether the parking direction of the ego vehicle 100 is the first or second direction, using the traveling information of the target vehicle 200, in step S410.

The warning condition adjusting apparatus 1 may compare the reference axis stored in the storage unit 130 to a radar axis generated through a radar signal reflected from the target vehicle 200 in response to a radar signal transmitted from the radar module 110. The warning condition adjusting apparatus 1 may determine that the parking direction of the ego vehicle 100 is the first direction, when the radar axis and the reference axis are similar to each other, and determine that the parking direction of the ego vehicle 100 is the second direction, when the radar axis and the reference axis are different from each other.

In steps S420 and S430, when the determination result indicates that the parking direction of the ego vehicle 100 is the first direction, the warning condition adjusting apparatus 1 may maintain the preset warning condition of the RCCW system, stored in the storage unit 130.

In steps S440 and S450, when the determination result indicates that the parking direction of the ego vehicle 100 is the second direction, the warning condition adjusting apparatus 1 may calculate the entry angle θ at which the ego vehicle 100 enters the parking space in the second direction, with respect to the reference axis, through Equation 1 above.

In step S460, when the entry angle θ is completely calculated, the warning condition adjusting apparatus 1 may compensate for the detection information of the ego vehicle 100, included in the warning condition of the RCCW system, by the entry angle θ.

The compensation target may include the horizontal distance information X and the vertical distance information Y from the ego vehicle 100 to the target vehicle 200 and the horizontal axis velocity $V_X$ and the vertical axis velocity $V_Y$ of the target vehicle 200, among the pieces of detection information of the ego vehicle 100. The other pieces of detection information, for example, the collision estimated time at which the target vehicle 200 will collide with the ego vehicle 100, the point where the target vehicle 200 collides with the ego vehicle 100, and the angle of the target vehicle 200 may be calculated by the compensation target.

The warning condition adjusting apparatus 1 may calculate the compensation horizontal distance information $X_C$ and the compensation vertical distance information $Y_C$ and the compensation horizontal axis velocity $V_{XC}$ and the compensation vertical axis velocity $V_{YC}$, using Equation 2 above, and compensate for one or more of the other pieces of detection information, for example, the collision estimated time at which the target vehicle 200 will collide with the ego vehicle, the point where the target vehicle 200 collides with the ego vehicle 100, and the angle of the target vehicle 200, using the compensation horizontal distance information $X_C$ and the compensation vertical distance information $Y_C$ and the compensation horizontal axis velocity $V_{XC}$ and the compensation vertical axis velocity $V_{YC}$.

In step S470, the warning condition adjusting apparatus 1 may change the warning condition of the RCCW system into a compensation warning condition.

The above-described embodiments of the present disclosure may be implemented in the form of computer programs which can be executed on a computer through various components, and the computer programs may be recorded in a computer readable medium. At this time, the medium may include a magnetic medium such as a hard disk, floppy disk or magnetic tape, an optical recording medium such as a CD-ROM or DVD, a magneto-optical medium such as a floptical disk, and a hardware device such as a ROM, RAM or flash memory, which is specifically configured to store and execute program commands.

The computer program may include an available program which is specifically designed and configured for the present disclosure, or publicly known to those skilled in the computer software field. Examples of the computer program may include high-level language codes which can be executed by a computer through an interpreter, as well as machine language codes which are generated by a compiler.

In the specification (or particularly the claims) of the present disclosure, the use of the term "the" and reference terms similar to "the" may correspond to both of a singular form and plural forms. Furthermore, when a range is described in the present disclosure, it is may indicate that the present disclosure includes an embodiment to which individual values belonging to the range are applied (unless referred to the contrary), and the individual values constituting the range are described in the detailed descriptions of the disclosure.

The steps constituting the method in accordance with the embodiment of the present disclosure may be performed in suitable order, when the order of the steps is clearly specified or unless referred to the contrary. The present disclosure is not limited to the order of the steps. In the present disclosure, all examples or exemplary terms (for example, and the like) are simply used to describe the present disclosure in detail. The scope of the present disclosure is not limited by the examples or exemplary terms, as long as the scope of the present disclosure is not limited by the claims. Furthermore, it is obvious to a person skilled in the art that various modifications, combinations and changes can be made according to design conditions and factors within the scope of claims or equivalents.

Although preferred embodiments of the disclosure have been disclosed for illustrative purposes, those skilled in the art will appreciate that various modifications, additions and substitutions are possible, without departing from the scope and spirit of the disclosure as defined in the accompanying claims.

What is claimed is:

1. A warning condition adjusting apparatus comprising a processor configured to:
calculate an angle at which an ego vehicle enters or leaves a parking space, with respect to a preset reference axis, and adjust reference detection information of the ego vehicle, included in a preset warning condition of a rear cross collision warning system configured to warn a driver of the ego vehicle about a passing-by vehicle adjacent to the parking space, according to the angle; and change the reference detection information, included in the preset warning condition of the rear cross collision warning system, to adjusted detection information upon determining that the calculated angle is different from a reference angle associated with the reference detection information.

2. The warning condition adjusting apparatus of claim 1, further comprising:
a radar module configured to receive a radar signal reflected from a passing-by vehicle and to detect the passing-by vehicle.

3. The warning condition adjusting apparatus of claim 2, wherein the processor uses the following equation to calculate the angle at which the ego vehicle enters or leaves the parking space, $$\text{Entry angle}(\theta) = \tan^{-1} \frac{V_X}{V_Y}$$

wherein '$V_X$' represents a horizontal axis velocity of the passing-by vehicle with respect to a radar horizontal axis, and '$V_Y$' represents a vertical axis velocity of the passing-by vehicle with respect to a radar vertical axis.

4. The warning condition adjusting apparatus of claim 1, wherein the processor uses the following equation to calculate adjusted horizontal distance information $X_C$, adjusted vertical distance information $Y_C$, an adjusted horizontal axis velocity $V_{XC}$, and an adjusted vertical axis velocity $V_{YC}$ implemented by adjusting the reference detection information of the ego vehicle, including horizontal distance information X, vertical distance information Y, a horizontal axis velocity $V_X$, and a vertical axis velocity $V_Y$, according to the calculated angle $$\begin{bmatrix} X_C \\ Y_C \end{bmatrix} = \begin{bmatrix} \cos\theta & -\sin\theta \\ \sin\theta & \cos\theta \end{bmatrix} \begin{bmatrix} X \\ Y \end{bmatrix}$$
$$\begin{bmatrix} V_{XC} \\ V_{YC} \end{bmatrix} = \begin{bmatrix} \cos\theta & -\sin\theta \\ \sin\theta & \cos\theta \end{bmatrix} \begin{bmatrix} V_X \\ V_Y \end{bmatrix}.$$

5. The warning condition adjusting apparatus of claim 4, wherein the processor uses the adjusted horizontal distance information $X_C$, the adjusted vertical distance information $Y_C$, the adjusted horizontal axis velocity $V_{XC}$, and the adjusted vertical axis velocity $V_{YC}$ to adjust one or more of a collision estimated time at which the passing-by vehicle collides with the ego vehicle, a point where the passing-by vehicle collides with the ego vehicle, and an angle of the passing-by vehicle.

6. The warning condition adjusting apparatus of claim 1, wherein the processor is further configured to:
determine a parking direction of the ego vehicle using traveling information of the passing-by vehicle,
wherein the processor changes or maintains the preset warning condition of the rear cross collision warning system based on the parking direction of the ego vehicle.

7. A warning condition adjusting method comprising:
calculating, by a processor, an angle at which an ego vehicle enters or leaves a parking space, with respect to a preset reference axis;
adjusting, by the processor, reference detection information of the ego vehicle, included in a preset warning condition of a rear cross collision warning system configured to warn a driver of the ego vehicle about a passing-by vehicle adjacent to the parking space, according to the calculated angle; and
changing, by the processor, the reference detection information, included in the preset warning condition of the rear cross collision warning system, to a adjusted detection information upon determining that the calculated angle of the ego vehicle is different from a reference angle associated with the reference detection information.

8. The warning condition adjusting method of claim 7, further comprising:
comparing a preset reference axis to a radar axis generated through a received radar signal reflected from the passing-by vehicle in response to a radar signal transmitted from a radar sensor installed in the ego vehicle before the calculating of the angle; and
determining a parking direction of the ego vehicle based on the result of comparing the reference axis to the radar axis,
wherein the changing of the reference detection information includes changing or maintaining the preset warning condition of the rear cross collision warning system based on the parking direction of the ego vehicle.

9. The warning condition adjusting method of claim 8, wherein in the calculating of the angle, the processor uses the following equation to calculate the at which the ego vehicle enters or leaves the parking space,
wherein '$V_X$' represents a horizontal axis velocity of the passing-by vehicle with respect to a radar horizontal axis, and '$V_Y$' represents a vertical axis velocity of the passing-by vehicle with respect to a radar vertical axis $$\text{Entry angle}(\theta) = \tan^{-1}\frac{V_X}{V_Y}.$$

10. The warning condition adjusting method of claim 7, wherein in the adjusting of the reference detection information, the processor uses the following equation to calculate adjusted horizontal distance information $X_C$, adjusted vertical distance information $Y_C$, an adjusted horizontal axis velocity $V_{XC}$, and an adjusted vertical axis velocity $V_{YC}$ implemented by adjusting detection information of the ego vehicle, including horizontal distance information X, vertical distance information Y, a horizontal axis velocity $V_X$, and a vertical axis velocity $V_Y$, according to the calculated angle $$\begin{bmatrix} X_C \\ Y_C \end{bmatrix} = \begin{bmatrix} \cos\theta & -\sin\theta \\ \sin\theta & \cos\theta \end{bmatrix} \begin{bmatrix} X \\ Y \end{bmatrix}$$

$$\begin{bmatrix} V_{XC} \\ V_{YC} \end{bmatrix} = \begin{bmatrix} \cos\theta & -\sin\theta \\ \sin\theta & \cos\theta \end{bmatrix} \begin{bmatrix} V_X \\ V_Y \end{bmatrix}.$$

11. The warning condition adjusting method of claim 10, wherein in the changing of the reference detection information, the processor uses the adjusted horizontal distance information $X_C$, the adjusted vertical distance information $Y_C$, the adjusted horizontal axis velocity $V_{XC}$, and the adjusted vertical axis velocity $V_{YC}$ to adjust one or more of a collision estimated time at which the passing-by vehicle collides with the ego vehicle, a point where the passing-by vehicle collides with the ego vehicle, and an angle of the passing-by vehicle.

12. A warning condition adjusting apparatus comprising a processor configured to:
determine whether a parking direction of an ego vehicle is a vertical direction or an oblique direction with respect to an entry road using sensor information; and
adjust a warning condition of a rear cross collision warning system of the ego vehicle in response to determining that the parking direction is the oblique direction, compared to a reference warning condition of the rear cross collision warning system when the parking direction is the vertical direction.

\* \* \* \* \*